Feb. 6, 1968 G. PETERSON 3,368,195
METHOD OF AND APPARATUS FOR PRODUCING AND
TRANSMITTING BOREHOLE SIGNALS
Original Filed Nov. 23, 1956 6 Sheets-Sheet 1

INVENTOR.
GLEN PETERSON

INVENTOR.
GLEN PETERSON

Feb. 6, 1968

G. PETERSON 3,368,195

METHOD OF AND APPARATUS FOR PRODUCING AND
TRANSMITTING BOREHOLE SIGNALS

Original Filed Nov. 23, 1956

INVENTOR.
GLEN PETERSON

INVENTOR.
GLEN PETERSON

INVENTOR.
GLEN PETERSON

United States Patent Office 3,368,195
Patented Feb. 6, 1968

3,368,195
METHOD OF AND APPARATUS FOR PRODUCING AND TRANSMITTING BOREHOLE SIGNALS
Glen Peterson, 540 S. 83rd East Ave., Tulsa, Okla. 74112
Substituted for abandoned application Ser. No. 623,855, Nov. 23, 1956. This application Jan. 28, 1963, Ser. No. 254,296
8 Claims. (Cl. 340—18)

This invention relates to the art of geophysics and particularly to the art of well-logging wherein cased boreholes are logged with radioactivity equipment, and the like, and casing joints and other magnetic irregularities in the casing are located as points of reference, or otherwise employed with the radioactivity logs.

The usual well-logging system for cased boreholes provides one or more radioactivity logs; for example, a gamma ray and a neutron log, and associated with these a casing collar log. The latter is generally employed to accurately extend below the surface of the earth, where the well is located, bench or fiduciary marks, so that formation boundaries and other zones of interest can be precisely fixed with respect to surface elevations. The cable, although it is usually clad in an armor of steel wires, stretches considerably, and when depth measurements depend upon it alone, large errors in depth can result. On the other hand, the steel casing, while it may have stretched somewhat in going into the well, is generally set in concrete and thereafter provides as permanent a system of reference marks as is known to man.

Fortunately, the casing comes in pieces or sections of about twenty feet in length, and these pieces or sections are fastened together by means of collars, threaded flush-type joints, or the pieces may in some instances be welded together. In any event, each collar or joint provides a magnetic discontinuity capable of producing a signal in a suitable detector, and this signal can, in turn, be used to make a mark on the record. Thus, the collars or joints provide a permanent and accurate depth grid having a spacing of about twenty feet, and from one or more of these grid marks all important depth measurements can be, and usually are made in the well.

For example, the radioactivity logs reveal, among other things, the important lithologic characteristics of the borehole, and the position in depth of these characteristics can be accurately tied to the nearest casing collar mark and thereby accurately referred to the elevation at the surface of the well. If a particular lithologic characteristic is being used in formation correlations from one well to another, very accurate correlations can be made by using the record marks which the casing collars or joints provide. Again, if the lithologic characteristics indicate producing formations, the casing can be accurately perforated at just the correct depths, and no others, by lowering a gun perforator and making depth measurements from the nearest casing collars or joints.

Older types of casing sections are joined together by means of collars, as is well-known, and these collars provide casing cross-sections which are considerably thicker than the remaining portions of the casing. Too, gaps between the two sections of casing being joined are often left within the collars. Detectors are available which have little or no difficulty in producing electric signals from these greatly thickened sections and/or casing gaps. More recent types of casing sections, however, are fastened together by threaded flush-type joints which provide little or no difference in cross-section, and practically no gap at the joint as compared with sections elsewhere. Such joints provide very much smaller signals than do old-fashioned collars.

Most well logging systems in use today are energized by power supplied from the surface. Older logging systems employed batteries carried with the borehole instrument. In the modern instruments, the power required to energize the subsurface instrument is transmitted down the logging cable. For this purpose both alternating and direct-currents have been used and each form of power has certain advantages and disadvantages. In this connection, it is important to note that one form of casing collar signal transmission system may be compatible with transmitting A-C power down the hole and entirely incompatible with transmitting D-C power, or vice versa.

Because many collar or joint signals, at the detectors, are small in amplitude, it is customary in many well logging systems to provide an amplifier in the subsurface instrument so that the collar signals reaching the surface will register above the background noise. Or it may be necessary to provide such additional things as rectifiers, filters, carrier modulators, and the like, as the transmission system employed may dictate, so that the collar signals can be separated from other signals being handled by the system or from the down-hole power.

Because of the smallness of the signals and for other reasons, it is also customary in casing collar locators to provide high impedance detectors so that the signals produced by the collars will be as large as possible. Since most collar detectors are of the inductive or magnetic type, this usually means many turns of fine wire about some kind of magnetic core. And since the logging cable is a high capacity transmission line which must be operated at low impedance, to have a useful band width it also means the high impedance detector must be shunt fed into the line or logging cable.

A few years back it was sufficient to obtain and transmit one radioactivity log at a time and if a customer wanted both gamma ray and neutron logs, two passes had to be made at the well. Today, as previously indicated, it is customary to take both radioactivity logs simultaneously and with them a collar log. Thus, a three channel transmission system has been found adequate. But the trend is toward an ever increasing number of radioactivity logs, and already two or more neutron logs are being made. Too, induced radioactivity logs are being experimented with and will undoubtedly soon become part of the usual well-logging service. Besides these, formation density logs are being made using radioactivity means; moreover, it would be very useful to add a borehole diameter log so that other logs taken could be given a more expert interpretation. As a result, a multi-channel well logging transmission system whereby more than three logs may be taken simultaneously is highly desirable. Nevertheless, it is generally desirable and considerably more economical to employ a "single-conductor" logging cable. This, in turn, requires that all of the signals produced by the borehole instruments and all the currents conveying power to the borehole instrument must in the ideal system be handled by the single central conductor and external sheath of the single conductor logging cable.

To accommodate such a multiplicity of services on a single pair of conductors, it is often necessary to add auxiliary equipment to the subsurface instrument whereby the various currents and signals can be properly separated and routed. Again, with the trend toward many simultaneous logs, as before stated, transmission space on the single conductor system is always at a premium, and some systems in use today require a considerable fraction of the transmission space be allocated to the transmission of casing collar and joint signals.

In well logging equipment it is also highly desirable to keep the volume of space required by the subsurface instrument at a very minimum. Excessively long instruments are difficult to handle at the well head, and the longer they are the more apt are they to get lodged in the well, particularly in those instances when the instrument is very little smaller in diameter than the well casing or tubing. With length about the only dimension available for the expansion of slim-hole instruments to include other services, it is highly desirable to provide well logging transmission systems which require the least number of parts and pieces.

Prior art well logging system suffers from one or more of the foregoing difficulties and limitations and in many ways fail to provide a simple ideal well logging transmission system. Accordingly, the purpose of this invention is to provide a well logging transmission system which closely approximates the ideal and which does not suffer from the foregoing limitations. It is a particular object of the invention to provide a casing-joint detection and transmission system which does not impose any constraints on the other signal channels of the system, nor on the transmission of power. Another specific object of the invention is to provide a well logging signal transmission system that is capable of continuous expansion to include additional well-logging services as they become available without always having to replace large portions of the equipment then in use. A third specific object of the invention is to provide a well-logging transmission system which requires the least number of elements in the subsurface instrument for producing and transmitting casing-joint signals. A fourth object is to provide a well logging transmission system which makes use of the power transmission space to transmit the casing-joint signals and therefore does not require additional transmission space on the cable. A fifth object is to provide a well logging transmission system, including casing joint location, that is compatible with the transmission of either alternating or direct currents, or both, for the energization of subsurface instruments.

Another particular object of the present invention is to provide low-impedance casing-joint detection apparatus in the subsurface instrument, and low-impedance signal separation apparatus in the surface instrument whereby "single conductor" cable can be most efficiently utilized. Still another object is to provide a well logging cable which optimizes the transmission space; that is, makes available for well-logging purposes the largest possible transmission space.

These and other objects and advantages of the present invention will become apparent from the following detailed description when considered with the accompanying drawings, wherein.

Figure 12:
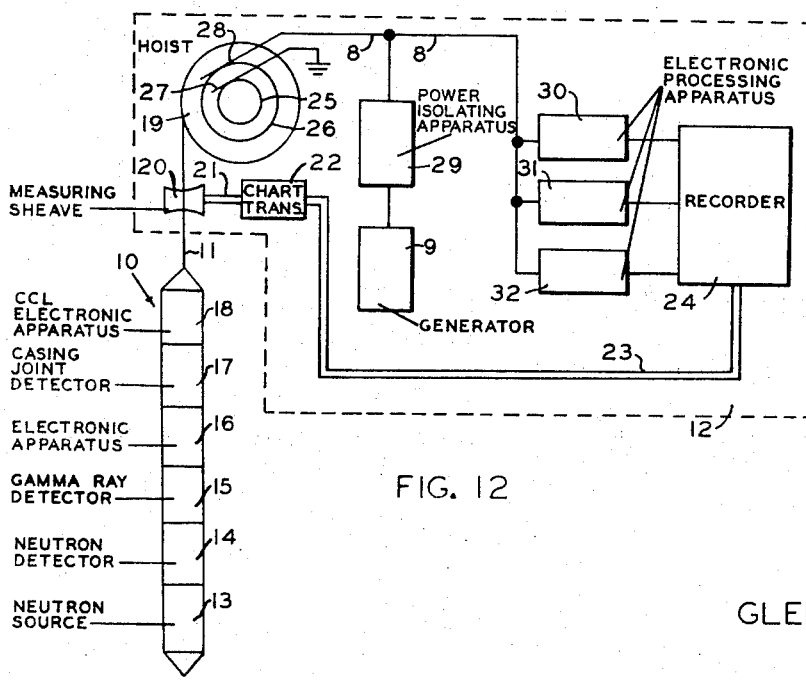
FIGURE 12 is a diagrammatic representation of a typical three-channel radioactivity and casing-joint well logging transmission system as practiced at the time the present invention was made.

Referring to the drawings in detail, particularly to FIG. 12, where a typical 3-channel radioactivity and casing-joint logging system is shown schematically in block diagram, 10 is the bore hole instrument supported in a well by means of cable 11 which also connects the instrument to the surface apparatus 12. Borehole instrument 10 is comprised of neutron source 13, neutron detector 14, gamma ray detector 15, electronic processing apparatus 16, casing-joint detector 17, and casing-joint electronic apparatus 18. The neutron detector 14 and gamma-ray detector 15 may be ionization chambers, Geiger counters, scintillation counters or any other apparatus by means of which radioactivity radiations produce electrical manifestations. Electronic processing apparatus 16 may be any kind of electronic gear, presently in use, by means of which the electric currents of the detectors 14 and 15 are amplified and further processed for passing them into the cable 11, including filters, amplitude and frequency modulators, rectifiers, etc. The casing-joint electronic apparatus 18 may also include an amplifier, one or more filters, modulators, rectifiers, etc., by means of which the signals of detector 17 are prepared for transmission up the cable.

The surface apparatus 12 may include a hoist having a drum 19 on which the cable 11 is wound and unwound, a depth measuring sheave 20 supported on shaft 21 by means of which the chart drive transmission 22 is also driven through the link 23 which connects 22 to the recorder 24. Hoist drum 19 is equipped with slip rings 25 and 26 and brushes 27 and 28 by means of which electrical connection is made to the cable 11. Properly speaking, the entire cable 11, including the portion wound on the drum 19, is part of the subsurface apparatus since it often places severe limitations on the subsurface apparatus, and since it is impossible or at least highly impractical to connect anything to the cable between the slip rings 25 and 26 and the point of attachment to subsurface instrument 10.

Continuing with a description of the surface apparatus, 9 is an electrical generator or power supply by means of which power is supplied to the subsurface apparatus, 29 is an isolating apparatus by means of which generator 28 is connected to conductor 8 and hence to cable 11. 30, 31 and 32 are electronic processing apparatuses for each of the neutron, gamma ray and casing-joint channels, respectively, and may include isolating impedances, filters, amplifiers, de-modulators, rectifiers, frequency meters, etc., as may be required to separate, identify and process the neutron, gamma ray and casing-joint signals for recording on a chart within recorder 24.

The apparatus above described is typical of the many radioactivity and casing-joint well logging systems in use today, and also to some extent of the present invention. Of course it is impossible in a single diagram to illustrate the variety of ways the building blocks of the various well logging systems have been connected and compounded. FIGURE 12 is, therefore, intended merely as a modest review of the well logging art as it was at the time the present invention was made, and as a point of embarkation in describing the present invention which is more typically illustrated by the block diagram of FIG. 1.

As before, 11 is the logging and hoisting cable, 19 the hoisting drum, 20 the depth measuring sheave, 21 the shaft by means of which 20 is supported and the transmission 22 is operated. The latter is now shown to include synchros 33 and 34 and the interconnecting cable 35, and shaft 36. Synchro 34 is generally wholly situated within and part of recorder 124, and a step down gear box (not shown) is interposed between 34 and the chart driving roller of the recorder (not shown) so that one or more inches of chart per hundred feet of well is transported as the borehole instrument 37 is moved up or down in the borehole and the well logging operation takes place. 38 is that portion of the chart which has already been thus transported and upon which a log has been transcribed.

Figure 1:
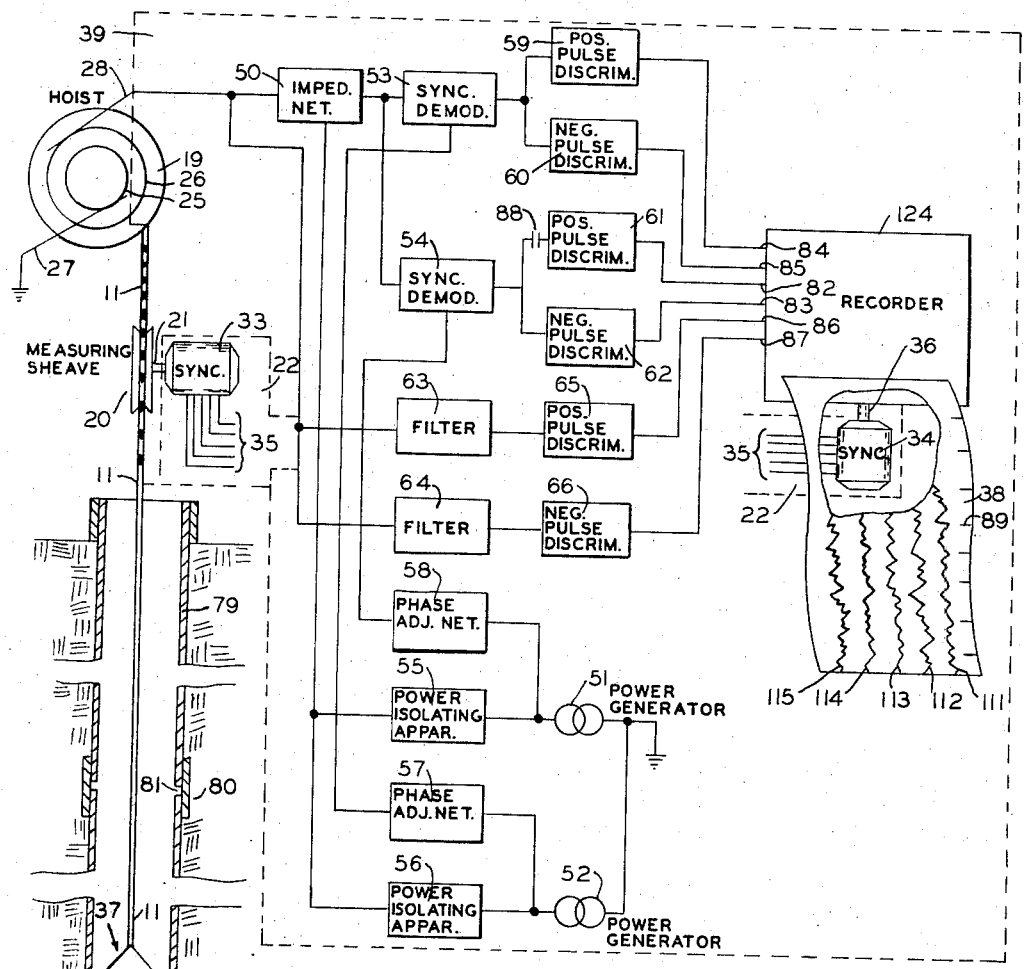
FIGURE 1 is a diagrammatic representation of the multi-channel radioactivity and casing-joint well-logging transmission system of the present invention.

The surface apparatus 39 begins at slip ring brush 28, and for reasons that have already been given and will further become manifest the entire cable 11 is considered an electronic portion of the subsurface apparatus which is usually considered to be comprised only of the borehole instrument 37 specifically. The system represented by FIG. 1 is a six-channel system because that many channels suffice to illustrate most of the pertinent features of the invention, and not because there is any basic limitation which limits the system of the present invention to any particular number of channels. Actually, many more channels than six are possible as will be seen. For the present, we will consider that subsurface instrument 37 is comprised of at least one neutron source 40, an N–n detector 41, an N–λ detector 42, a gamma ray detector 43 for detecting the natural radiations of the rocks, a shield of heavy metals 44, a gamma ray detector 45 for determining hole diameter, a gamma ray source 46, a gamma ray detector 47 for detecting radiations induced by neutron source 40; an electronic apparatus 48 and a casing-joint detector 49. These detectors are typical of services being provided, or about to be provided, one or two at a time, by radioactivity well logging operators. The system of this invention is able to handle all of them simultaneously and many more besides.

Returning to the surface equipment 39 of FIG. 1, in addition to those heretofore given it is comprised of the following additional major pieces: An impedance network 50 by means of which power is fed from generators 51 and 52 into the cable for energizing the subsurface instrument and which also serves to couple the cable to synchronous demodulators 53 and 54; 55 and 56 are further isolating apparatuses for generators 51 and 52, respectively, such as vacuum tube amplifiers, for example; 57 and 58 are phase adjusting networks by means of which reference signals are fed to synchronous demodulators 53 and 54, respectively; 59, 60, 61 and 62 are biased discriminators, with 59 and 61 arranged to pass pulses of positive polarity and reject pulses of negative polarity, and with 60 and 62 arranged to pass pulses of negative polarity and to reject pulses of positive polarity; 63 and 64 are isolation filters which couple directly into the logging cable through brush 28; 65 is again a biased discriminator for passing positive pulses and rejecting negative pulses; 66 is again a biased discriminator for passing negative pulses. It is to be understood that all of the elements 53 through 66 of the surface apparatus may include amplifiers as may be required for the best processing of the signals.

Figure 2:
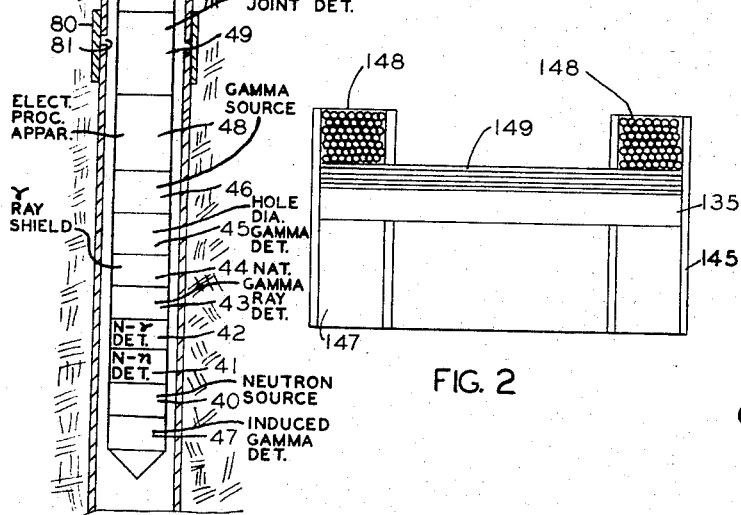
FIGURE 2 is a plan and elevation drawing in partial cross-section showing the construction of one form of casing-joint detector used by the invention.
Figure 3:
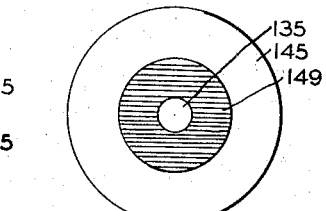
FIGURE 3 is an end view of the casing-joint detector shown in FIGURE 2.
Figure 16:
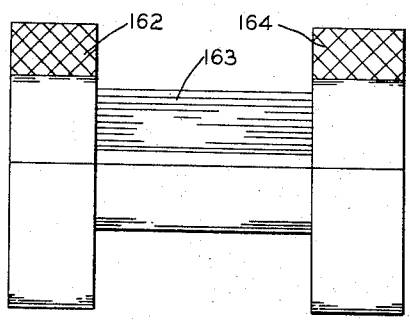
FIGURE 16 is a plan view in partial cross-section showing an idealized construction for the casing-joint detector of the present invention.

To obtain a working knowldge of the invention, the operation of the casing-joint detector 49 will first be explained in connection with FIG. 4. It is basically comprised of two spaced apart inductance coils which may be arranged as shown in FIGURES 2 and 16, for example. Alternating current from low frequency generator 51, FIG. 1, passes through isolating apparatus 55, impedance network 50, logging cable 11, the primary 68 of transformer 67, FIG. 4, and thence through the coils $L_1$ and $L_2$ of casing-joint detector 49, the primary 71 of transformer 70, and the primary 74 of transformer 73, and thence to ground return completing the circuit. The condenser 78 is of such value that the low frequency currents from generator 51 are pretty well impeded. If transformers 67, 70 and 73 are reasonably ideal, they will have small leakage inductances and so present, to the line, the impedances seen by their secondaries. In the case of transformer 73, this will largely be resistance; the case of transformer 70, the reflected impedance will largely be inductive; while 67 is a transformer operating at a frequency higher than transformers 70 and 73, and casing-joint detector 49, and so will not much affect the latter. Thus, if 49 is an inductance in the neighborhood of a henry or so, it can be seen that it will offer considerable reactance to frequencies in the neighborhood of a few hundred cycles per second.

Figure 19:
FIGURE 19 is a schematic diagram of the casing-joint detector of the present invention.

In particular, casing-joint detector 49 is comprised of two oppositely wound coils $L_1$ and $L_2$ connected in series and having a reasonably large mutual inductance M, FIG. 19, so that the total inductance of the combination is given by $$L = L_1 + L_2 - 2M \tag{1}$$

The value of the inductance elements $L_1$ and $L_2$, and of the mutual M, will be determined in part by the core on which the coils are wound, and if this core is open, as it is in the instance of the casing-joint detector, the self-inductances and mutual will also be partially determined by the magnetic environment external to the coils and core; for example, the casing 79 which lines the borehole and the collars 80 or joints 81 connecting sections of casing, as shown in FIG. 1. Thus, when the inductance of the casing-joint detector 49 varies, as the detector passes a collar or joint both the phase and amplitude of the low frequency current in the line will be varied compared to what the phase and amplitude were previously. Accordingly, synchronous detector 54, having a phase reference on low-frequency generator 51 will produce an output pulse of voltage, but synchronous detector 53, having a phase reference on high-frequency generator 52 will not. If the pulse of voltage out of 54 is positive, it will be passed by discriminator 61, but not by 62, and recorded where connection 82 is arranged to record on the chart 38. If the pulse of voltage out of 54 is negative, it will be passed by discriminator 62, but not by 61, and recorded where connection 83 is arranged to record on chart 38.

Figure 13:
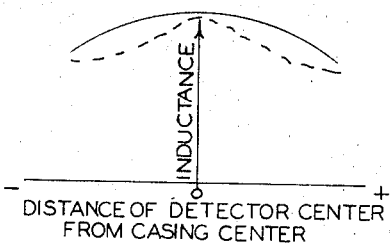
FIGURE 13 is a graph showing how the inductance of the casing-joint detector of FIG. 2 varies with lateral motion inside the casing.

As casing joint detector 49 swings laterally in the borehole, the overall inductance L, shown in Equation 1 will generally increase as the instrument moves closer to the casing from a central position, as shown in FIG. 13. There the full line shows the inductance variation when the system is balanced, in a manner yet to be described, with the casing-joint detector near the casing wall. The broken line, on the other hand, shows the inductance variation when the system is balanced with the casing-joint detector centralized in the borehole. Therefore, if the overall system is also arranged so that positive inductance variations produce positive phase changes at the input terminals of synchronous detector 54, a slowly-varying output pulse of voltage will appear at the output terminals of 54 and, unless prevented, will be passed by discriminator 61. Usually, one does not wish to register the lateral motions of the instrument in the borehole, and hence we insert a condenser 88, in the lead from 54 to 61, of such size that the slowly varying pulses of the lateral motion of the casing-joint detector in the borehole are blocked. The channel, represented by 61, is thereby saved for a better use.

Figure 14:
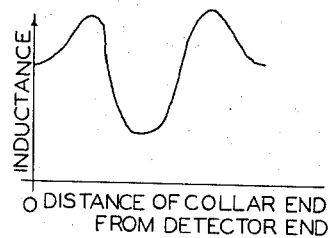
FIGURE 14 is a graph showing how the inductance of the casing joint detector of FIG. 2 varies in the presence of a casing collar.

As casing-joint detector 49 passes a collar or casing-joint, on the other hand, the inductance of the detector 49 first increases slightly, as shown in FIG. 14, then decreases rather sharply to a value less than the average, and following this, again increases slightly. Under this circumstance the phase of the low frequency currents will vary negatively during the negative portion of the inductance swing, synchronous demodulator 54 will produce a pulse of voltage having a negative polarity, and this pulse will be passed by discriminator 62 and recorded as a collar 89 on chart 38. As seen, the casing-joint detector is comprised simply of two inductance coils arranged in a particular way and which occupy a rather insignificant band width in the frequency channel used to energize the subsurface instrument. Obviously, of course, if desired, the casing-joint detector may use some other frequency and current than that primarily provided to power the instrument.

While the inductance variations of casing-joint detector 49 will also slightly affect the phase of other alternating currents that may be present, these "cross-talk" variations will be small if the modulating frequencies of the system are judiciously chosen with respect to the selection circuits and phase modulators. Therefore, the relatively small "cross-talk" pulses which result may be eliminated in the discriminators through the proper control of the bias levels. For example, a system using frequencies 159, 1590, 15,900 and 159,000 cycles per second could accommodate at least eight channels of information, and such a wide frequency spacing would certainly eliminate most of the "cross-talk."

One other very important feature of the present invention has now been exposed, and that is that all of the carrier or modulating frequencies are generated in the surface equipment; hence a very large bulk of apparatus has been kept out of the subsurface instrument.

Referring once more to FIG. 4, the remaining portions of the subsurface instrument will now be described. Transformer 73, composed of primary 74 and secondaries 75, 76 and 77 is the main power supply unit of the electronic apparatus 48. Secondary 75 operates into rectifier filter 90 to provide plate and screen voltages for the tubes 93a through 93n, as shown, and where these tubes typically have plate load resistors 94a through 94n. Secondary 76 provides current for heating the filaments 95a through 95n of the tubes 93 as shown, and 77 represents any other secondaries that may be required to power the subsurface electronic apparatus. 91 and 92 are voltage divider and bleeded resistances of power supply 90.

No attempt is made to show the complete electronic circuitry that might be used, and indeed such a showing is unnecessary. For purposes of the present invention it suffices to show that subsurface power supply means is intended and is provided, and that this power supply means can employ the same alternating current generator, namely 51, FIG. 1, that is used to provide a carrier for the casing-joint detector.

Additional phase modulators 96 and 101, for example, are provided to handle other channels of information. Modulator 96 comprised of a suitable core 107 and windings 97, 98 and 99, makes use of the positive pulse channel which we left open at the casing-joint detector and power frequency; namely, the channel comprised of modulator 96, transformer 70, synchronous demodulator 54, condenser 88, biased discriminator 61 and recorder connection 82. While the carrier frequency is low in this channel it will be sufficient to handle the borehole diameter log where the counting rates need not be high in order to provide all the information that is required; hence modulator 96 is shown operating out of gamma-ray detector 45 through electronic apparatus 48a which is a portion of the total composite electronic apparatus 48.

While it is not mandatory, the radioactivity detectors of the present invention preferably are of the counter type wherein each participating particle or ray of the incident radiation produces a sharp pulse of current in the circuit of the detector, which pulse is amplified and further processed by an electronic apparatus that is provided in each instance to produce unidirectional pulses of current of known polarity in the control windings of each modulator. Other types of detectors than counters may be used, such as ionization chambers, provided additional means is included to pulse the output signals of such detectors. Again, steady signals can be handled by the system but only one can be accommodated at each modulating frequency. Too, other logging services than radioactivity; for example, electrical well-logging services can be accommodated by the system providing appropriate transducers are included ahead of the phase modulators.

Modulator 96 has a core 107 of suitable ferromagnetic material of high permeability such as a tape of supermalloy or mu-metal; or core 107 may be composed of certain ferrites well-known to commerce and often used as modulators. Winding 97 provides the high inductive reactance of the modulator, and the inductance of this winding is determined by the number of turns of the winding and the permeability of the core. The latter is held at a preassigned reference value by bias winding 99 and is varied by control winding 98 which receives pulses of current out of electronic apparatus 48a. Thus, as pulses are produced in detector 45 and processed by 48a, the inductance of 97 decreases or increases, depending upon whether the pulses of current in 98 adds to or subtracts from the bias of winding 99. If 98 is polarized to cause the inductance to increase, positive pulses will appear at the input terminals of 61, FIG. 1, having been passed by condenser 88, and these positive pulses will also be passed by discriminator 61 and appear at terminal 82 of recorder 124. It is here assumed that 124 includes a set of five counting rate meters for handling the pulses of the radioactivity channels, and that is the counting rates which are recorded and make logs 111 through 115 on chart 38.

Bias winding 99 of modulator 96, and also bias winding 105 of modulator 101, obtain their biases from the voltage divider of power supply 90, with resistors 100 and 106, respectively, serving as isolating devices. Since the bias currents usually need not be large and since plenty of voltage is available at the power supply, resistors 100 and 106 can be large.

The pulsing inductance variations of winding 97 are fed into the line through transformer 70 which has an appropriate turns ratio for matching the modulator into the line and other loads present. At the higher modulating frequencies, but not so much as the low frequencies, there is a problem of preventing the modulator variations from being swamped by the high shunt capacity and high series resistance of the logging cable. It is for this purpose that transformers 67 and 70 are furnished, and the problem will be further discussed in connection with the higher frequency modulators typically represented by 101.

Modulator 101 has a suitable core 108, reactance winding 102, bias winding 105, and two control windings 103 and 104. Winding 103 is polarized, in relation to 48d, to cause negative inductance variations in 102; while winding 104 is polarized, in relation to 48c to cause positive inductance variations in 102. These respective inductance variations will, in turn, produce negative and positive pulses of voltage at the terminals of synchronous demodulator 53 having a phase reference on high frequency generator 52. The positive pulses are passed by discriminator 59, rejected by discriminator 60, and recorded at terminal 84 of recorder 124. The negative pulses are passed by discriminator 60, rejected by discriminator 59, and recorded at terminal 85 of 124. Thus detectors 41 and 47, with the assistance of electronic apparatuses 48c and 48d, and the other devices just described produce logs 112 and 113 on record 38. Condenser 78 is chosen to by-pass the high frequency currents of generator 52 and to otherwise make the circuit comprised of transformer 67 and reactance 102 sensitive to the high frequency currents. The inductance of casing-joint detector 49 is also sufficient to impede the flow of the high frequency currents beyond it.

Figures 4, 5:
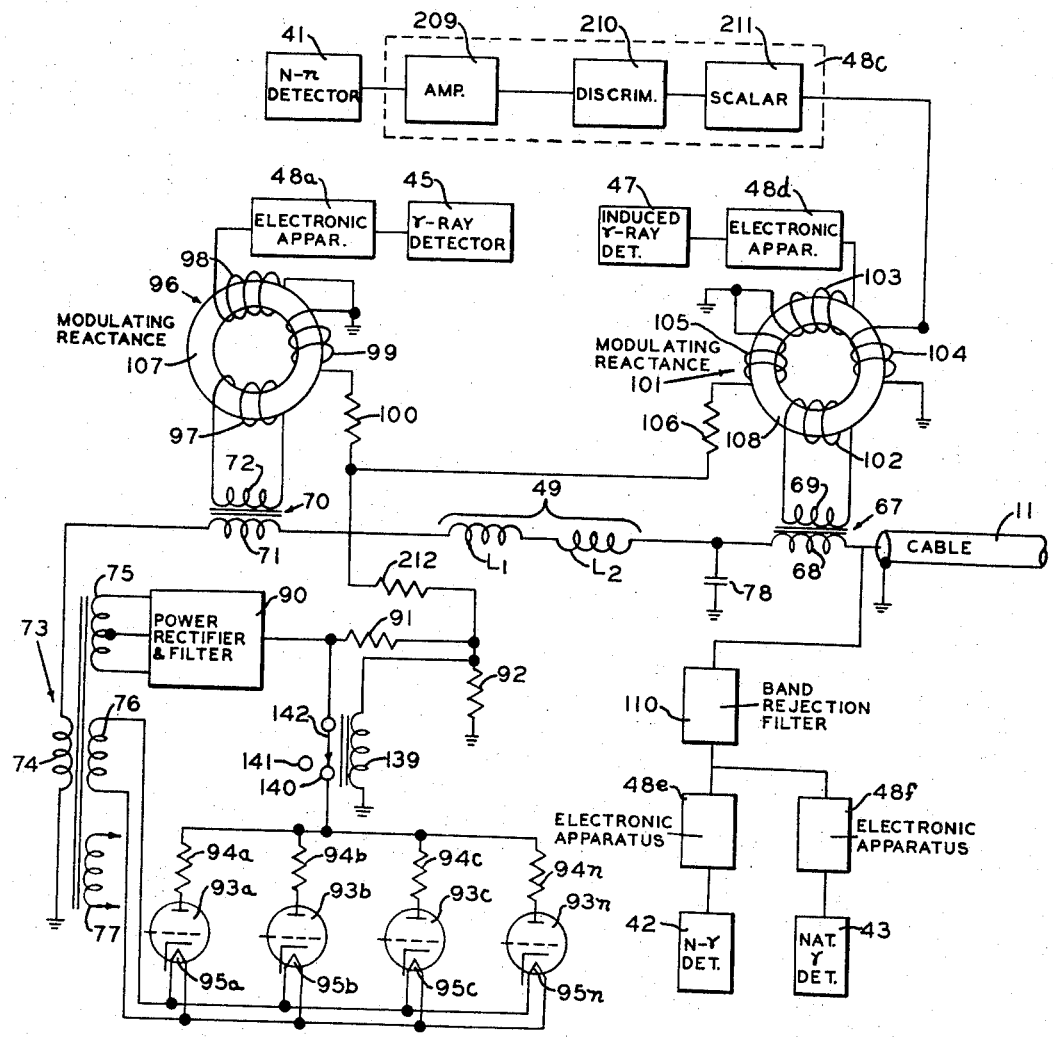
FIGURE 4 is a more detailed schematic circuit diagram of a typical portion of the subsurface apparatus of the present invention.
FIGURE 5 is a schematic circuit diagram of an alternative arrangement of apparatus used in practicing the invention.

Back to FIG. 4, 110 is a multiple band rejection filter having a direct current path through it whereby unidirectional positive pulses originating at detector 42, and processed by electronic apparatus 48e, and unidirectional negative pulses originating at detector 43, and processed by electronic apparatus 48f, are passed into cable 11. The bands which are eliminated by 110 are the low-frequency and high-frequency bands centered about the frequencies of generators 51 and 52. While the phase modulators 49, 96 and 101 do not require large band widths, the band widths required are, nevertheless, finite and must have proper provision made for them.

In the surface equipment of FIG. 1, 63 and 64 are, likewise, multiple band rejection filters, and while separate filters are here provided one common filter would generally suffice. 65 is a biased discriminator which passes positive pulses and rejects negative pulses, and 66 is a biased discriminator which passes negative pulses and rejects positive pulses. Thus, the information obtained by detectors 42 and 43 is fed into recorder 124 at terminals 86 and 87, respectively, and recorded as logs 114 and 115 on chart 38.

As shown in FIG. 4, the portion 48c, of electronic apparatus 48, may be comprised of several distinct parts as required. Typically, detector 41 feeds into pulse amplifier 209, followed by a discriminator 210, and a scaler 211, and 209, 210, and 211 are all part of 48c. The electronic apparatus portions 48a, 48b, 48d, etc., may be similarly constituted. The primary purpose of 209 is to amplify or raise the level of the pulses out of detector 41 so that they can more easily be handled, and sometimes it is also necessary to shape the pulses and this can be done by choosing appropriate amplifier circuits. The usual purpose served by discriminator 210 is to pass pulses of a given uniform height and polarity, as between certain positive or negative voltage levels, and reject all others. In this way, pulses of small amplitude or too large amplitude, which may not truly represent the process being logged, may be eliminated. Scaler 211 serves to reduce the counting rate which must be transmitted up the cable and thereby relieves some of the burden placed on modulator 101. Binary type scalers may be used as well as decimal scalers. For example, if a scale of 10 decimal scaler is employed, information from high effective counting rates may be quite easily handled by modulator and cable. Several varieties of such scalers are available commercially.

Except for certain details, which will next be considered, a typical six-channel radioactivity and casing-joint logging system has been provided, and the equipment of the subsurface instrument kept at an absolute minimum.

Figure 6:
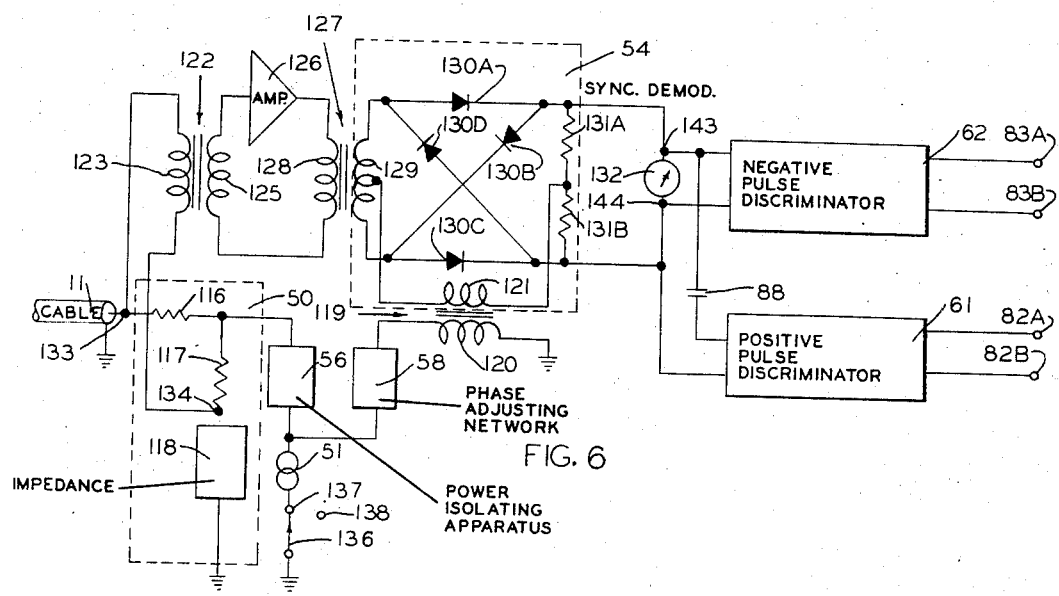
FIGURE 6 is a more detailed schematic circuit diagram of a typical portion of the surface apparatus of the present invention.

Referring to FIG. 6, impedance network 50 is seen to be typically comprised of resistances 116 and 117 and impedance 118. While the latter may, in the simplest applications, also be a resistance, 118 is preferably a complex impedance designed to be the counterpart of the impedance of the subsurface apparatus including cable 11. It is seen that resistors 116, 117, impedance 118 and the subsurface impedance form a bridge circuit, as perhaps more easily recognized in FIG. 20, and this circuit can be balanced for all frequencies concerned through the selection and adjustment of resistors 116, 117 and impedance 118. If this balance is made with the subsurface instrument 37 motionless and riding the wall of uniform casing, and in the absence of other modulation, the voltage across bridge terminals 133 and 134, where transformer 122 is connected, would be essentially zero. Amplifier 126 can, therefore, be set to have high gain and the setup made extremely sensitive to variations which will occur when the subsurface instrument is put in motion and other modulations permitted. The subsurface instrument can be generally immobilized and prepared for obtaining the above bridge balance by stopping it in the borehole and reducing the output of generator 51 to a value such that the tubes of electronic apparatus 48 are not sufficiently heated to be conducting. At the same time, this would allow adequate output for balancing the bridge, and would substantially bring the subsurface impedance up to full value. Alternatively, relay switching apparatus 139 which operated on pulses of D.C. from power supply 90 can be provided in the subsurface instrument, FIG. 4, to do the required turning-on-and-off of subsurface instruments. Relay switching apparatus 139 has switch contact arm 142 in the plate supply lead to electronic apparatus 48, and this contact alternatively makes and breaks the circuit by closing to contact 140 and opening to contact 141, as surface switch 136, FIG. 6, is opened to contact 138 and closed to contact 137. The Ledex Mfg. Co., Los Angeles, Calif., and the Price Electric Co., Frederick, Md., make stepping switches which satisfy these requirements.

Transformer 122, FIG. 6, has a primary 123 and a secondary 125, as shown. The latter connects to the input of amplifier 126, and 126 is terminated in transformer 127, comprised of a primary 128 and a secondary 129, and which drives synchronous demodulator 54. A phase reference for 54 is provided, as before explained, by generator 51, adjustable phasing network 58 and transformer 119. The phase of the reference voltage at the terminals of transformer secondary 121 is adjusted to be in phase agreement with the input voltage across the terminals of transformer winding 129, at the time the bridge balance is made by means of a variable resistance or capacitance in 58, as is well known to the art of electronics. Thus, when the phase of currents in the subsurface arm, of the aforedescribed bridge, vary positively, from what they were when the bridge was balanced, positive pulses of voltage appear across the output, terminals 143 and 144 of synchronous demodulator 54. And when the phase of currents in the subsurface bridge arm vary negatively, negative pulses appear across output terminals 143 and 144.

While the bridge network 50 is not absolutely essential to the invention, it is highly preferred since it permits a greater amplification of signal variations than would otherwise be possible. Nevertheless, the invention is operative without network 50, as long as there remains some means of isolating the generator output from the demodulator input, such as 56. By the same token, isolation means 55 and 56 are generally unnecessary when 50 is employed. But without any isolation whatever between the two generators 51 and 52, it is preferred to then place them in series rather than in shunt. It is also to be understood that the power generating system, including all the signal carrier generators, may be comprised of vacuum tubes and/or transistors with the alternating currents of different frequencies originating in oscillators.

Returning to FIG. 6 once more, synchronous demodulator 54 is seen to be comprised of four diodes 130a through 130d series connected in a ring but with the terminal junctions connected at input and output as in a lattice. Because of the "ring-around-the-rosy" connection of the diodes, this type of device is sometimes called a ring modulator, or ring demodulator, depending upon the application.

The input to demodulator 54 is the primary winding 129 of transformer 127, and the output is taken across two resistors 131a and 131b which are generally equal in value or are adjusted slightly to provide the best balance. The phase reference voltage is applied across the center tap of transformer winding 129 and the central junction of resistors 131a and 131b, as shown. If care is taken in the selection of the diodes 130a through 130d, a balance of the order of 60 db can be obtained in the ring modulator; that is, the output for the null condition of the network will be 1000 times less than the input. Using run of the mill diodes a balance of the order of 40 db can usually be obtained without any selection whatever. With a 60 db balance, the demodulator is sensitive to phase changes of the order of 1 part in 1000, and with a 40 db balance, of 1 part in 100.

It is to be understood that other forms of phase sensitive detectors, besides synchronous demodulators, may be used in the practice of the present invention. Many such are well-known to the art of electronics and practically all of them can be used in the present application.

Meter 132 is connected across the output terminals 143 and 144 of synchronous demodulator 54 to provide a steady indication in casing-joint locator service. It is sometimes desirable, particularly in gun perforator services, to be able to set the collar locator at the center of a particular collar near the zone to be perforated. Knowing the distances from the casing-joint locator to the gun perforator, and from the last collar, where the locator is centered, to the zone to be perforated, it is both easy and accurate to then let in exactly the right footage of cable when the shots are fired from the perforator. This is one major advantage which alternating current collar locators have over the permanent-magnet variety. The latter are able to provide readings only when the system is in motion.

While the details of operation of the system have been explained in connection with one synchronous demodulator only, it is to be understood that all like devices employed in other channels of the system operate in essentially the same manner. It is also well-known that when the input voltages of a synchronous demodulator are not synchronous with the reference voltage, the average output of the demodulator is zero. This of course is only true when each modulating pulse contains a sufficient number of cycles at the carrier frequency that a valid average is taken. Thus, the carrier frequencies must be high enough, and the modulating pulses wide enough to contain ten or more complete carrier cycles, for example. A 10 kilocycle carrier is, therefore, able to accommodate a counting rate of the order of 1000 counts per second with pulse widths about 1 millisecond. When necessary, as for high counting rate detectors, scalers may be employed in the subsurface instrument to reduce the counting rates which must be handled by the transmission system.

Reference is now made to FIGURES 2, 3, 7, 8, and 9 where some of the details of casing-joint locator 49 are shown, 145 and 147 are two bobbins upon which coils 146 and 148 are wound. The bobbins are generally cylindrical in form, a requirement imposed by the cylindrical nature of boreholes and not by the device itself, and the coils are preferably as identical as it is possible to make them. These coils and bobbins are spaced apart on a laminated iron core 149, as shown, and connected in series opposition so that the mutual inductance of the combination opposes the sum of the two self inductances, as given in Equation 1.

Figure 7:
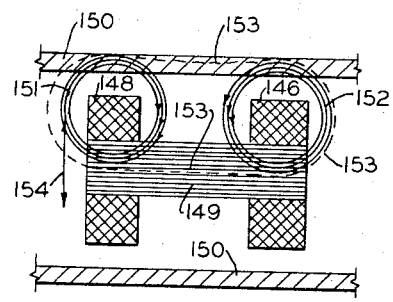
FIGURE 7 is a cross-sectional diagram of the casing-joint detector, of FIGURE 2, shown situated in uniform casing and used to explain the operation of the casing-joint detector.

When the locator is situated in uniform casing, as in FIG. 7, coil 146 has some flux lines which link it individually, of which 152 are typical. Likewise coil 148 has flux lines 151. Additionally, if the coils 146 and 148 were connected series aiding, there would be flux lines linking both of them, of which 153 is typical. Since the coils are connected in series opposition, however, flux lines such as 153, do not exist and that is why 153 is shown dotted. But 153 represents a coupling condition between coils 146 and 148 which removes flux lines from the bundles 152 and 151 about the two coils individually. Thus, if either of the coils was alone present, it would have more flux lines linking it, in any given situation, than it has when both coils are present. As the detector moves back and forth in a uniform section of casing, as shown by arrow 154, both the self and mutual inductances increase due to the enhanced permeance of the flux paths external to the core. But the self inductances increase slightly faster than the mutual so that the overall inductance is increased somewhat. This is the condition depicted by FIG. 13. The reason for this is the inductance per coil turn increases as the coils are moved closer to the casing, but the coupling coefficient between the two coils, determined by the geometry of the arrangement and the thickness of the casing walls, is not much altered with lateral motion.

Figure 8:
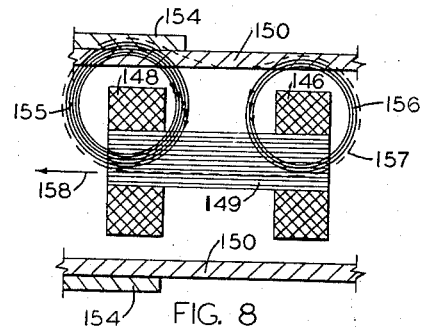
FIGURE 8 is a cross-sectional diagram of the casing-joint detector, of FIG. 2, shown situated near one end of a casing collar and used to explain the operation of the casing-joint detector.
Figure 9:
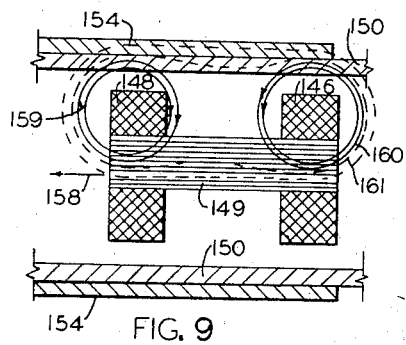
FIGURE 9 is a cross-sectional diagram of the casing-joint detector, of FIG. 2, shown nearly enveloped by a casing collar and used to explain the operation of the casing-joint detector.

When the detector moves in the direction of arrow 158, FIG. 8, and the end of a collar gets into proximity of one coil 148, additional flux lines will link this coil, as shown typically by the bundle 155, so that the self inductance of this coil is increased. But coil 146 will not yet be much affected, nor will the mutual coupling between the two coils. Hence the inductance of the combination will be increased as shown by the first positive peak in FIG. 14. As the detector moves still further within the collar, until one end of the collar essentially envelops both coils, as shown by FIG. 9, the self inductances of both coils would be increased except that the mutual inductance has in this situation increased more rapidly than the self inductances due to the greatly enhanced coupling coefficient. To add iron to the external magnetic circuit is to let the flux lines expand, and this effectively amounts to the same thing as bringing the two coils closer together. Thus, while the inductance per coil turn increases so also does the coupling coefficient between the two coils, and since the mutual inductance is the product of the inductance per coil turn and the coupling coefficient, and since the mutual inductance is negative, the overall inductance of the combination will decrease as shown by the central minimum, FIG. 14.

After the detector has moved still further so that the other end of the collar (not shown) is situated about coil 146 only, the situation of FIG. 7 is repeated except for being reversed, and the overall inductance exhibits a second peak as shown by FIG. 14.

Figure 10:
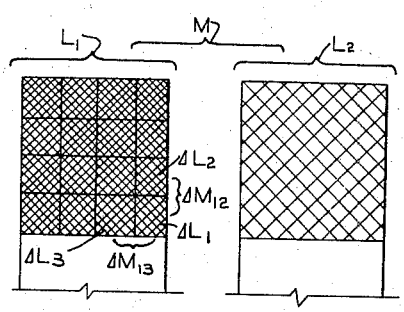
FIGURE 10 is a cross-sectional diagram of the casing-joint detector of FIG. 2 used in analyzing its performance.

Perhaps the inductance variations of casing-joint detector 49 can be better understood by making use of FIG. 10 and resorting to some mathematical expressions. Suppose that the two spaced apart coils have self inductances $L_1$ and $L_2$, respectively, and further, that each is composed of infinitesimal sections which have self-inductances $\Delta L_1$, $\Delta L_2$, $\Delta L_3$, etc., and mutuals $\Delta M_{12}$, $\Delta M_{13}$, $\Delta M_{23}$, etc. Thus, we can write $$L_1 = \Delta L_1 + \Delta L_2 + \Delta L_3 + \ldots$$
$$+ \Delta M_{12} + \Delta M_{13} + \Delta M_{23} + \ldots \quad (2)$$

or upon summing all the N-elements which we suppose are equal $$L_1 = N\Delta L + N\Delta M \quad (3)$$

If $K_1$ is the coefficient of coupling between equal self-inductance elements $\Delta L$ $$L_1 = N\Delta L + Nk_1\sqrt{\Delta L \cdot \Delta L} = N\Delta L(1+k_1) \quad (4)$$

The quantity $N\Delta L$ is the sum of all the infinitesimal inductance elements for which we can write $N\Delta L = L_0$. Thus $$L_1 = L_0(1+k_1) \quad (5)$$

Similarly, for $L_2$ $$L_2 = L_0(1+k_2) \quad (6)$$

As previously stated, when $L_1$ and $L_2$ are joined together, in series opposing relationship, their self inductances add and this sum is opposed by the mutual between them. If K is the coefficient of coupling between coils $L_1$ and $L_2$, we have in light of Equation 1 and the definition of K $$L = L_1 + L_2 - 2K\sqrt{L_1 L_2} \tag{7}$$

Substituting from Equations 5 and 6

$$L = L_0[2 + k_1 + k_2 - 2K\sqrt{(1+k_1)(1+k_2)}] \tag{8}$$

When both coils are identically wound, which is the preferred case of the present invention, when the system is balanced $L_1 = L_2$ so that $k_1 = k_2 = k$, whereupon (8) becomes $$L = 2L_0(1+k)(1-K) \tag{9}$$

But as a collar is approached by one end of the detector, we have an unbalanced relationship and are first obliged to apply Equation 8. The variation of inductance will, accordingly, be given by the differential relation $$L = L_0\{\Delta k_1 - K[(1+k_1)(1+k_2)]^{-\frac{1}{2}}(1+k_2)\Delta k_1\} \tag{10}$$

If the variation is small, we can again consider $k_1 = k_2$, so that $$L = L_0 \Delta k_1 (1-K) \tag{11}$$

Equation 11 exactly specifies the variation of inductance as qualitatively described in the foregoing for the condition of the collar in the proximity of one coil. And since under all circumstances $K < 1$, the variation $\Delta L$ is intrinsically positive for positive increments of coupling $\Delta k_1$ of the turns of self inductance.

As the collar envelops both coils of the detector so that the magnetic environment is again essentially symmetrical we can use Equation 9 with both $k$ and $K$ variable, getting $$L = 2L_0[(1-K)\Delta k + (1+k)(-\Delta K)] \tag{12}$$

It is seen that $\Delta L$ will be negative as long as $$\Delta K > \Delta k \frac{(1-K)}{(1+k)} \tag{13}$$

Since $(1+k) > (1-K)$, regardless of the values of K and $k$, and since the best we can write for $\Delta k$ with respect to $\Delta K$ is that $$\Delta k \leq \Delta K \tag{14}$$

it is seen that $\Delta L$, under the circumstance that the collar envelops both coils symmetrically, is always negative.

Justification for (14) has already been qualitatively expressed. In more quantitative physical terms, the justification is simply that the geometry is such that the coupling of the spaced apart coils is more effected by environmental changes of large diameter than is the coupling coefficient of the rather tightly wound coils of the self inductance. Put another way, the flux path of the mutual inductance of the two coils has a considerably larger fraction in iron than does the flux paths of the self inductance so that when the amount of iron in this path changes, the mutual inductance changes more than the two self inductances. As a matter of fact, each self inductance path has about the same length in air as does the mutual inductance path. This can quite readily be seen by examining FIG. 7.

The foregoing basic facts can be made of further use to improve the casing-joint detector construction of the present invention, as shown in FIG. 16, 162 and 164 are the spaced apart coils of the detector and 163 is the central core. In this improved construction, the inside diameters of the coils 162 and 164 is made somewhat larger than the outside diameter of the core 163, and the latter is shortened so that it no longer extends through the coils as in FIG. 2. With this improved construction the length of flux paths which the self inductances have in air is greatly increased, while the proportionate change for the mutual inductances is only a small amount. Thus, external iron changes will have a still larger relative effect on the mutual inductances and $\Delta L$ for this case will be even larger than it was before.

We are obliged to consider what happens when we have a casing-joint such that the permeance of the external magnetic circuit is decreased. When this is the situation, the foregoing variations are effected oppositely. $\Delta k$, in Equation 11 becomes a negative quantity when the joint is centered over one coil, and $\Delta L$ becomes an intrinsically negative variation. But when the joint is centered between the two coils, $\Delta K$ becomes a negative quantity, while at that moment $\Delta k$ probably is not changing much, thus $$\Delta L \simeq L_0 \Delta K (1+k) \tag{15}$$

so that $\Delta L$ is positive. Hence for streamline joints the variation will be approximately the inverse of FIG. 14.

Figure 15:
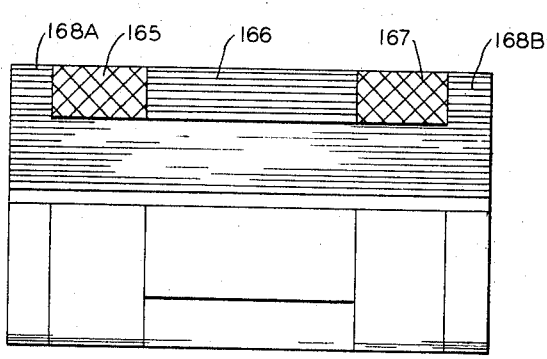
FIGURE 15 is a plan view in partial cross-section showing another improved construction for the casing-joint detector of the present invention.

Assuming that the same synchronous demodulator connections are maintained as before, the optimum detector geometry for a casing-joint detector for streamline joints is shown in FIG. 15. In this instance the coils 165 and 167 are essentially embedded in an iron structure comprised of core 166 and poles 168a and 168b which protrude beyond the coil ends. The proportionate variation of the self inductances have now been increased relatively to the mutual inductance which again optimizes the situation for negative pulses.

If an operator is equipped with both types of detectors he can, for any given job, choose the one he wants. Alternatively, if the positive pulse channel of generator 51 is not used for obtaining another log, but is left open, the same detector can be used for both types of collars and conditions optimized by reversing the phase of the reference voltage to synchronous demodulator 54. Again, the detector may be optimized to produce, at casing joints, positive and negative pulses of the same size by creating a detector that is a compromise between the designs of FIGURES 16 and 15.

Figure 20:
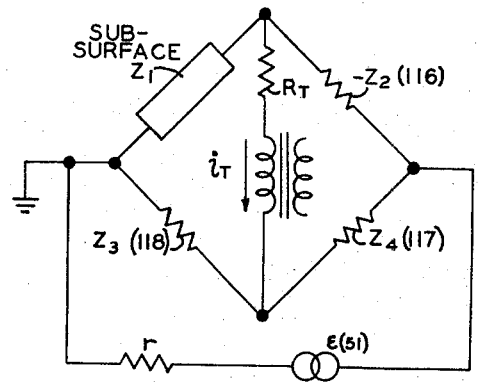
FIGURE 20 is a schematic diagram of the Wheatstone bridge arrangement of surface and subsurface apparatus used in practicing the invention.

We now turn to the overall problem of signal transmission to and from the borehole. FIG. 20 shows the preferred bridge arrangement whereby currents are fed into the borehole and phase-and-amplitude-modulated signals removed therefrom. $Z_1$ is the complex impedance of the borehole instrument including the logging cable. $Z_2$ is the impedance 116, FIG. 6, $Z_3$ is the impedance 118 and $Z_4$ is the impedance 117. $R_T$ is the resistance of the primary circuit of transformer 122, including what is reflected from the secondary load, and $r$ is the series generator impedance including that of the isolation apparatus 55 if the same is used. Making use of Smythe, "Static and Dynamic Electricity," McGraw-Hill Book Co., 1st edition, page 219, we express the current through the transformer primary, $i_T$, in terms of the circuit impedances and the generator voltage E, by the following relation:

$$i_T = \frac{(Z_1 Z_4 - Z_2 Z_3) E}{R_T(Z_1 + Z_2)(Z_3 + Z_4) + R_T r(Z_1 + Z_2 + Z_3 + Z_4) + r(Z_1 + Z_3)(Z_2 + Z_4) + Z_1 Z_2 Z_3 + Z_2 Z_3 Z_4 + Z_3 Z_4 Z_1 + Z_4 Z_1 Z_2} \tag{16}$$

$$= \frac{(Z_1 Z_4 - Z_2 Z_3) E}{Z_1[R_T(Z_3 + Z_4) + R_T r + r(Z_2 + Z_4) + Z_2 Z_3 + Z_3 Z_4 + Z_2 Z_4] + R_T Z_2(Z_3 + Z_4) + R_T r(Z_2 + Z_3 + Z_4) + r Z_3(Z_2 + Z_4) + Z_2 Z_3 Z_4} \tag{17}$$

If, in the simplest case, all arms of the bridge are pure resistance except $Z_1$, and $$Z_1 = A + jB \quad (18)$$

then $$i_T = \frac{[(A+jB)R_4 - R_2R_3]E}{(A+jB)F^2 + G^3} \quad (19)$$

where $$F = [R_T(R_3+R_4) + R_T r + r(R_2+R_4) + R_2R_3 + R_3R_4 + R_2R_4]^{1/2}$$
$$G = [R_T R_2(R_3+R_4) + R_T r(R_2+R_3+R_4) + rR_3(R_2+R_4) + R_2R_3R_4]^{1/3} \quad (20)$$

Rationalizing (19) we get $$i_T = (AR_4 - R_2R_3)(AF^2 + G^3) + B^2F^2R_4 + \frac{j[BR_4(AF^2+G^3) + BF^2R_2R_3]}{(AF^2+G^3)^2 + B^2F^4} \quad (21)$$

If the bridge is put into balance initially for real components; i.e., for D.C. or low frequency A.C.

$$AR_4 = R_2R_3 \quad (22)$$

and $$i_T = \frac{\{B^2F^2R_4 + j[BR_4(AF^2+G^3) + BF^2AR_4]\}E}{(AF^2+G^3)^2 + B^2F^4} \quad (23)$$

Further, if as is generally desirable transformer 122 is bridged into the circuit; i.e., has a large series resistance so that the signal circuit draws little or no power, and if the resistance of the generator circuit is small, as is also generally desirable $$r \ll A, R_2, R_3, R_4 \ll R_T \quad (24)$$

whereupon $$F^2 = R_T(R_3+R_4)$$
$$G^3 = R_T A \frac{R_4}{R_3}(R_3+R_4) \quad (25)$$

and $$i_T = \frac{BR_4\left\{B + jA\left(2+\frac{R_4}{R_3}\right)\right\}}{R_T(R_3+R_4)\left\{A^2\left(1+\frac{R_4}{R_3}\right)+B^2\right\}} \quad (26)$$

The phase angle $\phi$ which the current $i_T$ takes with respect to generator voltage E will be given by $$\tan \phi = \frac{A}{B}\left(2+\frac{R_4}{R_3}\right) \quad (27)$$

Figure 17:
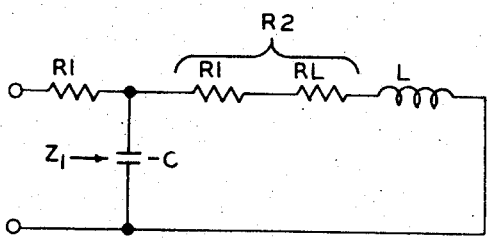
FIGURE 17 is a circuit diagram of the effective impedances operating in the casing-joint detection channel of the transmission system.

FIG. 17 shows the subsurface complex impedance for the low frequency case. The cable is represented by the T-network comprised of resistors $R_1$ and capacitor C. The down-hole load is represented by $R_L$; $R_2$ is taken as the sum of $R_1 + R_L$; and L is the inductance of the casing joint detector. It can be shown that the impedance looking into this network; i.e., the subsurface impedance as seen at slip ring brushes 27 and 28, FIG. 1, is given by $$Z_1 = R_1(1-W^2LC)^2 + R_2(1+W^2C^2R_1R_2) + \frac{jW\{L(1-W^2LC) - CR_2^2\}}{(1-W^2LC)^2 + W^2C^2R_2^2} \quad (28)$$

At frequencies appreciably below resonance, where it is best to operate; i.e., $W^2LC \ll 1$, $$Z_1 \simeq \frac{(R_1+R_2) + W^2C^2R_1R_2^2 + jW(L - CR_2^2)}{1 - W^2C^2R_2^2} \quad (29)$$

Further, if L is greater than about 0.4 h, $C \simeq 1$ μf., $R_1 \simeq 100\Omega$, $R_2 \simeq 200\Omega$, and $W < 1000$ $$Z_1 \simeq (R_1+R_2) + jWL \quad (30)$$

and Equation 27 becomes $$\tan \phi = \frac{R_1+R_2}{WL}\left(2+\frac{R_4}{R_3}\right)$$
$$\simeq = \frac{300}{400}\left(2+\frac{R_4}{R_3}\right) \quad (31)$$

If $R_4/R_3$ is of the order of 1, it is seen that $\tan \phi$ will lie between 2 and 3, or $63° < \phi < 71°$. In this region, a 1% change in inductance L, and this is probably as small a variation as we would ever expect to get, would make a change in $\phi$ of about 4 minutes, and this is readily measurable at the terminals of a synchronous demodulator. Moreover, the component of voltage measured by a synchronous demodulator, having reference and signal phases in approximate agreement, is the imaginary component. Thus, the maximum available variation will be when the real and imaginary components are equal and $\phi = 45°$. Impedances can be readily adjusted to obtain this condition if the $Z_3$ arm of the bridge is made complex.

Figure 18:
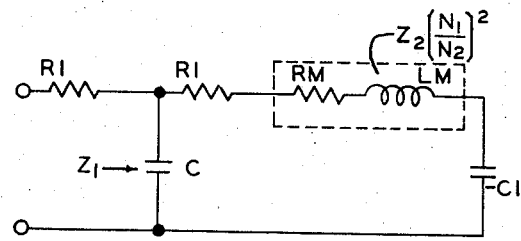
FIGURE 18 is a circuit diagram of the effective impedances operating in a typical radioactivity signal transmission channel.

FIG. 18 shows the subsurface complex impedance for the high frequency case. The T-network comprised of $R_1$, $R_1$ and C again represents the cable. $C_1$ is the capacity of condenser 78, FIG. 3, and $$Z_s \frac{N_1^2}{N_2}$$

is the impedance of modulator 101 referred to the primary circuit of transformer 67, and $N_1$, $N_2$ are the primary and secondary turns, respectively. It is assumed that $C_1$ effectively by-passes all impedances which follow it in the circuit, and that filter 110, FIG. 4, does not appreciably add to the effective circuit impedance at the frequencies of interest. If, for simplicity, it is assumed that $C_1 = C$, and $R_m = 0$, it can be shown that the impedance looking into the network from slip ring brushes 27 and 28 is given by $$Z_1 = \frac{W\tau_1\left\{5 + W^2\tau_1^2\left[1 - \frac{4\tau_2}{\tau_1} + W^2\tau_2^2\right]\right\} + j\left\{2 + W^2\tau_1^2\left[1 - 3\frac{\tau_2}{\tau_1} + W^2\tau_2^2\right]\right\}}{WC_1\left\{W^2\tau_2^2 + \left[2 - W^2\left(\frac{N_1}{N_2}\right)^2 L_m C_1\right]^2\right\}} \quad (32)$$

where $$\tau_1 = C_1 R_1; \quad \tau_2 = \left(\frac{N_1}{N_2}\right)^2 \frac{L_m}{R_1}$$

The phase angle, $\phi$, which $i_T$ now takes with respect to generator voltage E is $$\tan \phi = \frac{2 + W^2\tau_1^2\left[1 - 3\frac{\tau_2}{\tau_1} + W^2\tau_2^2\right]}{W\tau_1\left\{5 + W^2\tau_1^2\left[1 - 4\frac{\tau_2}{\tau_1} + W^2\tau_2^2\right]\right\}} \quad (33)$$

With a modulator which is able to change inductance several fold, it can be shown that with the types of cable presently available commercially ($C_1 = 1$ mf., $R_1 = 100\Omega$) significant changes in $\phi$ can be obtained for frequencies up to 5 or 6 kilocycles. It is clear that the time constant $\tau_1 = C_1 R_1$ is the limiting factor in the design of the system for high frequency use. We look, therefore, for a more optimum cable design.

The capacity of a cylindrical condenser is given by the relation $$C = \frac{6.45 KY}{\log_{10}\frac{r_2}{r_1}} \quad (34)$$

where Y is the length of the cable in feet, $r_2$ and $r_1$ the outer and inner radii, respectively, K is the dielectric constant and C is the capacity in mmf. The resistance of the central copper conductor, on the other hand, is given by $$R = \frac{PY}{r_1^2} = \frac{1.7 \times 10^{-6} \times 12}{3.14 \times r_1^2} = \frac{2.56 \times 10^{-6} Y}{r_1^2} \quad (35)$$

where Y is again the length in feet, $r_1$ is the radius of the conductor in inches, and R is given in ohms. Thus, the time constant of the cable is $$\tau = RC = \frac{6.45 K Y 6.5 \times 10^{-12}}{r_1^2 \log_{10} \frac{r_2}{r_1}}, \text{ seconds}$$

$$= \frac{1.64 \times 10^{-17} K Y^2}{r_1^2 \log_{10} \frac{r_2}{r_1}}, \text{ seconds} \quad (36)$$

To optimize $\tau$ with respect to $r_1$, take $$\frac{d\tau}{dr_1} = \frac{[1.64 \times 10^{-17} K Y^2] \left[ 2r_1 \log_{10} \frac{r_2}{r_1} - r_1^2 \frac{\frac{r_2}{r_1^2}}{\frac{r_2}{r_1}} \right]}{\left[ r_1^2 \log_{10} \frac{r_2}{r_1} \right]^2} = 0$$

or $$\log_{10} \frac{r_2}{r_1} = 1/2 \quad (37)$$

Suppose that we limit $r_2$ to 0.187 inch, then $r_1 = .0592$, or about A.W.G. No. 9. Substituting these values in (36) letting $K=3$, and taking a cable 20,000 ft. long, it is seen that $$\tau = \frac{1.64 \times 10^{-17} \times 3 \times 4 \times 10^8}{(.059)^2 \log_{10} \frac{.187}{0.92}} = \frac{1.97 \times 10^{-8}}{3.5 \times 10^{-3} \times .5}$$

$$= 11.3 \times 10^{-6} \text{ seconds} \quad (38)$$

This is almost a ten-fold improvement over the logging cables presently available, as far as the modulation system of the present invention is concerned. With such a cable, it would be possible to operate at frequencies up to 40 or 50 kilocycles and with cables 20,000 feet or more in length. Because of the increased size of the central conductor, the cable preferred by the present invention would also have considerably smaller power losses, at low power frequencies, due to the much lower series resistance. The series resistance of this cable at room temperatures would be about 14.6 ohms and the capacity 0.77 mf. The overall diameter would be in the neighborhood of ⅝ inch.

Figure 11:
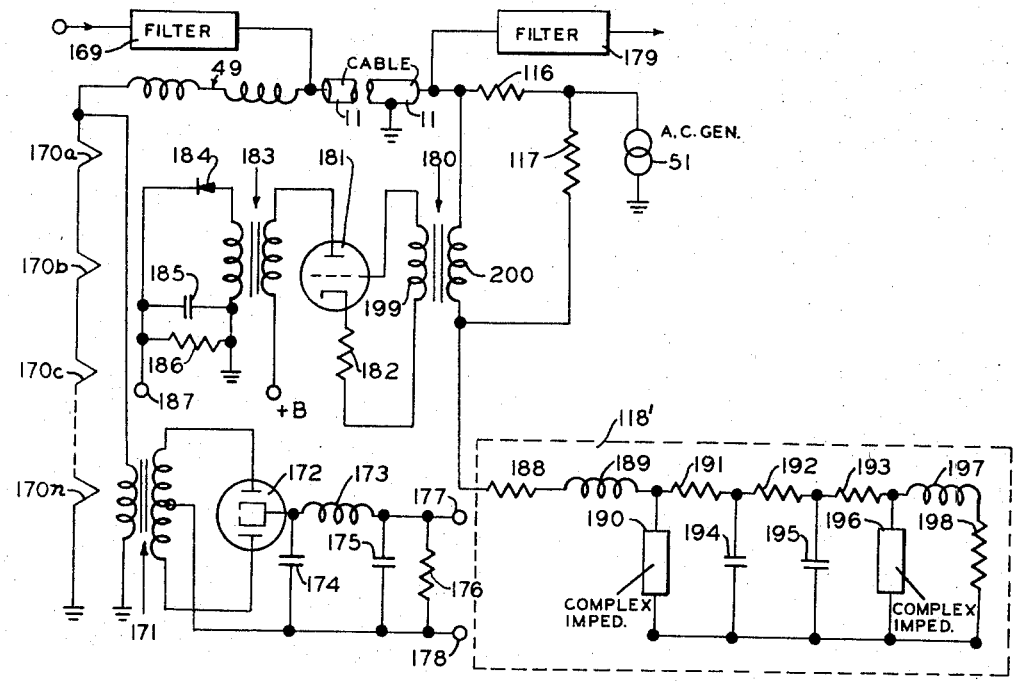
FIGURE 11 is a schematic circuit diagram of an alternative arrangement of apparatus used in practicing the present invention.

FIG. 11 illustrates an alternative arrangement of apparatus used in practicing the present invention, wherein the casing-joint signals are transmitted as changes in the overall or absolute magnitude of the subsurface impedance variations. As before, 51 is an A.C. power generator, 116 and 117 are two resistive arms of the bridge arrangement, before described, 118′ is a complex impedance arm of the bridge used to simulate the total subsurface impedance as seen looking in from the secondary 199 of transformer 180. In the network 118′, 188 is the series resistance, and 189 the leakage inductance, of transformer 180 primary winding 200. 190 is the impedance seen looking into filter 179; 191, 192, 193 are resistors and 194 and 195 condensers forming a pie-network used to simulate the cable; 196 is the impedance seen looking back through filter 169; 197 is the average value of the inductance of the casing joint detector 49, and 198 is a resistor representing the total effective load occurring after detector 49. All of the required values can be readily measured and/or calculated, and when put into the network 118′, the bridge can be balanced over a wide band of frequencies. In this way, the variations produced when casing-joint detector 49 passes a collar appear as signals across the terminal of secondary 199 of transformer 180. These signals are amplified by tube 181, having cathode bias resistor 182 and output transformer 183. The output from the latter is rectified by means of 184, filtered by means of condenser 185 and resistor 186, and by means of terminal 187 connected to a recorder.

In the down-hole portion of this circuit, $170_a$ through $170_n$ are vacuum tube heaters in the subsurface instrument, and they are connected in series across the down-hole voltage supply. Plate voltage for these tubes is obtained by means of transformer 171, rectifier tube 172 and the filter circuit comprised of 173, 174 and 175. The plate voltage thus obtained is available across terminals 177 and 178. By means of high-pass filter 169, signals from other portions of the system are fed into the cable and removed at the surface by means of a similar filter 179.

FIG. 5 shows still another arrangement of surface apparatus which is used in practicing the present invention. It consists of a three-winding transformer 201, which is substituted for the balanced bridge network of FIGURES 6 and 11. FIG. 5 shows the transformer 201 substituted for the bridge network of FIG. 11. In a similar way, transformer 201 is also substituted for the bridge network 50 of FIG. 6. As noted, the transformer has three windings: A primary 202, a secondary 203 and a tertiary 204. Power from alternating current generator 51 is fed through primary 202 to the cable and thence to the subsurface instrument. Current from 51 also flows through transformer tertiary 204 and impedance network 118′. The windings 202 and 204 are wound in opposition on transformer core 205, or at least connected to 51 so that the current through 202 produces a magetomotive force which is exactly opposed by the magnetomotive force due to current flowing in winding 204. In this way, a steady state balance is obtained under the circumstance that no modulation is taking place in the borehole instrument, and the output across the secondary 203 is substantially zero. When, however, modulation takes place in the borehole instrument, the balance is upset and modulation signals appear across secondary terminals 207 and 208. These signals may then be applied to an amplifier and one or more synchronous demodulators, as in FIG. 6, or they may be applied through amplifier tube 181 to a rectifier and filter circuit, as in FIG. 11.

To obtain the foregoing balance in transformer 201, it is necessary that the impedance network 118″ be the counterpart of the borehole impedance including the cable. If a balance is required at one frequency only, it is clear that 118″ need only contain two or more impedance elements which combine to reflect into primary 202, with opposite sign, the resistance and reactance found, at that frequency, in the borehole instrument. If, however, a balance is required at more than one frequency, means must be provided in 118″ to reflect into primary 202, with opposite sign, the resistances and reactances found in the borehole instrument at these frequencies. If many frequencies are used, about the only practical means of providing a balance is to make 118″ the proportional counterpart of the borehole instrument impedance as shown for 118′ in FIG. 11.

While the two windings 202 and 204 can be made equal insofar as the number of turns on core 205 are concerned, it can be shown that such an arrangement wastes the least amount of casing-joint generated signal power, this arrangement is unnecessarily wasteful of the power generated by 51 since it requires that the current dissipated through the windings 202, 204, and associated circuits, be equal. Because the voltage generated across the terminals 207 and 208 of secondary winding 203 is equal to the product $$-N_2 \frac{d\phi}{dt}$$

where $N_2$ is the number of secondary turns on core 205 and $\phi$ is the magnetic flux in core 205; and since $\phi$ is, in turn, equal to the product of ampere turns on the core and the core permeance; it is clear that the requirement for the aforementioned steady-state balance is that $$N_1 i_1 + N_3 i_3 = 0 \qquad (39)$$

where $N_1$ and $N_3$ are the respective number turns of, and $i_1$ and $i_3$ the respective currents in windings 202 and 204 when there is no modulation. Thus, each impedance element $Z_i$ provided in network 118″, and each corresponding impedance $Z_j$ of the subsurface instrument must satisfy the relation $$Z_i = \frac{N_3}{N_1} Z_j \qquad (40)$$

It will be recalled that impedance matching considerations for the optimum transfer of power require that $$Z_i = \left(\frac{N_3}{N_1}\right)^2 Z_j \qquad (41)$$

Accordingly, it happens that the only condition under which both relations (40) and (41) can be met is when $N_1 = N_3$.

FIG. 5 shows a D-C generator in series with A-C generator 51. This is also an alternative arrangement which may be used in practicing the invention when, for one reason or another, D-C power is wanted in the subsurface instrument. Since a conduction path of relatively low impedance is of necessity provided by the D-C generator, the addition thereof does not greatly effect the use of the A-C generator. In some forms of subsurface apparatus it is convenient to supply part of the subsurface power in the form of D-C, and part in the form of A-C. For example, all the power used to energize the tubes of the electronic apparatus 48, FIG. 1, of the subsurface instrument may be supplied in the form of D-C, while energy to operate the casing-joint detector and other sub-surface modulators may be supplied in the form of one or more alternating currents.

While many forms and arrangements have been described for practicing the present invention, it is clear that all the combinations and arrangements which might be provided by those skilled in the art cannot possibly be covered. For example, while the synchronous detectors described herein are to be preferred, other forms of phase detectors known to the art of electronics may be used. Synchronous detectors can also be made from vacuum tubes and even from rotating machinery. Again, many types of discriminators by means of which pulses of given polarity and amplitude can be passed or rejected are well known to electronics.

The oldest and perhaps best known of these discriminating devices is the triode biased to cutoff; while the simplest of all discriminators is the slightly biased diode connected in one direction for one polarity of pulses and in the opposite direction for the opposite polarity. In modern equipments, the biased single shot multivibrator, or univibrator as it is often called, is much used. And in this class of discriminator the well-known Schmidt circuit is perhaps the best known as well as the most useful.

The present invention also provides for the use of selective filters and phase adjusting circuits in several different places. Manifold varieties of these are known to the art of electronics and all of them which meet the principles and satisfy the requirements of the invention may be used. Accordingly, it is unnecessary to show any one of these circuits in particular.

It is further clear that while a six channel system has been explicitly provided by the invention, as described, additional channels may be provided by including additional alternating current generators, synchronous detectors, discriminators, etc., in the surface equipment and additional modulators and selective circuits in the subsurface equipment. If the generator frequencies are widely spaced, the necessary selection of frequencies for the modulators can be provided simply through the use of appropriately designed coupling transformers, such as 67, FIG. 4, and appropriately designed modulator reactances. Transformers particularly responsive to frequency bands a decade or so apart, may be provided through the selection of core materials, winding turns and coupling coefficients. Modulator reactances may likewise be provided by the selection of core materials and winding turns to provide modulating reactances that are large enough to do some good at one frequency but not at another. This type of selection, while not complete, is adequate in a pulse system which makes use of limiters, discriminators, etc., for the final selection of pulses. The discriminators can be set to select pulses of a given polarity and amplitude only. Thus, if a modulator produces some modulation at the wrong frequency, the discriminators can be so set that the relatively small pulses thus produced are insufficient to pass the discriminator threshold.

Again, while inductive types of modulating reactances have been shown in describing the invention, the invention shall not be limited to these. Capacitive types of modulating reactances may be used as well. Several types of capacitance modulators are known to the art of electronics. Condensers having nonlinear dielectrics, for example barium titanate, the dielectric constant of which is a function of the bias applied, may be used as modulators. Likewise, crystal diodes having barrier capacities that are functions of applied bias may also be used. Furthermore, reactance tube modulators, well-known to the arts of phase and frequency modulation, may be used in the practice of the present invention. These and manifold other arrangements which may be made by those skilled in the art fall within the scope of the invention; accordingly the invention shall be defined in terms of and limited only by the appended claims.

I claim:

1. Apparatus for producing electrical signals in boreholes and for transmitting said signals therefrom comprising a surface instrument, a subsurface instrument and a hoisting and current-conducting cable interconnecting said surface and subsurface instruments, said subsurface instrument contained in an external housing mechanically and electrically connected to said cable and comprised internally of at least a transducer and an electronic apparatus, said transducer having a transmission path responsive to the materials found in and around said borehole and producing electrical currents which are manifestations thereof, said electronic apparatus requiring electrical power for its operation and having a signal handling path of transmission and a power handling path of transmission, said cable comprised of at least an inner insulated conductor and an outer conducting and mechanically supporting sheath, said transducer and said electronic apparatus connected to said insulated condctor and said external sheath of said cable, said transducer transmission and transducing path and said electronic apparatus power consuming path being series connected and in shunt connection with said electronic apparatus signal handling path, and this combination in series connection with said cable, said surface apparatus comprised of at least an alternating current power generator, means for amplifying and recording said transducer signals, electrical means for separating the signals produced by said transducer from the currents of said alternating current power generator, comprised of a balanced bridge network, having input and output terminal pairs, in combination with a synchronous demodulator, having input, output and phase reference terminal pairs, and at least one voltage discriminator having input and output terminal pairs, said input terminal pair of said bridge network connected to said cable, said output terminal pair of said bridge network connected to said input terminal pair of said synchronous detector, said output terminal pair of said synchronous detector connected to said input terminal pair of said voltage discriminator, said output terminal pair of said voltage discriminator connected to said recorder, said phase reference terminal pair of said synchronous demodulator connected to a phase adjusting network and said phase adjusting network connected to said alternating current generator, said alternating current generator and said cable being connected in series.

2. Apparatus, as in claim 1, with said connection of bridge network output terminal pair with synchronous demodulator input terminal pair broken and said amplifier means inserted therebetween.

3. Apparatus for producing electrical signals in boreholes and for transmitting said signals therefrom comprising a surface instrument, a subsurface instrument and a hoisting and current-conducting cable interconnecting said surface and subsurface instruments, said subsurface instrument contained in an external housing mechanically connected and electrically connected to said cable and comprised internally of at least a transducer and an electronic apparatus, said transducer having a transmission path responsive to the materials found in and around said borehole and producing electrical currents which are manifestations thereof, said electronic apparatus requiring electrical power for its operation and having a signal handling path of transmission and a power handling path of transmission, said cable comprised of at least an inner insulated conductor and an outer conducting and mechanically supporting sheath, said transducer and said electronic apparatus connected to said insulated conductor and said external sheath of said cable, said transducer transmission and transducing path and said electronic apparatus power consuming path being series connected and in shunt connection with said electronic apparatus signal handling path, and this combination in series connection with said cable, said surface apparatus comprised of at least an alternating current power generator, means for amplifying and recording said transducer signals, electrical means for separating the signals produced by said transducer from the currents of said alternating current power generator comprised of a three-winding transformer, a synchronous demodulator and at least two voltage discriminators, with said three windings designated primary, secondary and tertiary, one terminal of each of said primary and tertiary connected together and to one terminal of said generator, the other terminal of said generator connected to said cable sheath, the second terminal of said primary connected to said cable inner conductor, the second terminal of said tertiary connected to one terminal of an impedance, the other terminal of said impedance connected to said cable sheath, the primary and tertiary being wound in opposition about a common ferromagnetic core, said impedance being adjusted to reduce the flux variations produced by said alternating current generator in said core by the currents in said primary and tertiary windings to a minimum, said transformer secondary wound about said common ferromagnetic core, one of said discriminators adapted to pass pulses of positive current and to reject pulses of negative current, the second of said discriminators adapted to pass pulses of negative current and to reject pulses of positive current, each of said amplifying means, synchronous demodulators and voltage discriminators having input and output terminals, respectively, said transformer secondary connected to said input terminals of said amplifying means, said output terminals of said amplifying means connected to said input terminals of said synchronous demodulator, said output terminals of the latter connected to said input terminals of said voltage discriminators, the output terminals of said discriminators connected to said recording means, said synchronous demodulator having also phase reference terminals connected to said alternating current generator.

4. Apparatus, as in claim 3, said recording means including counting rate meters, having input and output terminals, and specific multi-trace recording apparatus, with the output terminals of said voltage discriminators connected to the input terminals of said counting rate meters and the output terminals of the latter separately connected to traces of said multi-trace recording apparatus.

5. Apparatus for producing casing joint signals in boreholes and for transmitting said signals therefrom comprising a surface instrument, a subsurface instrument, and a hoisting and current conducting cable, having at least one insulated conductor and a current return sheath interconnecting said surface and subsurface instruments, said subsurface instrument contained in an external housing mechanically and electrically connected to said cable sheath and comprised internally of at least a casing joint detector and an electrical apparatus, said surface apparatus comprised of at least one three-terminal isolating network, one alternating current generator, one amplifier, one rectifier-filter means, indicating and recording means, cable hoisting means, cable measuring means, and means interconnecting said cable measuring means and said recording means whereby a chart within said recorder is driven at a predetermined rate by said cable measuring means, power for operating said electrical apparatus and said casing joint detector within said subsurface instrument derived from said alternating current generator, said electrical apparatus connected in series with said casing joint detector, said cable, two terminals of said isolating network and said alternating current generator, said amplifier connected to the third terminal of said isolating network, said rectifier filter means connected to said amplifier and said rectifier filter means connected to said recorder.

6. An electrical signal transmission system comprising at least one alternating current generator having at least two output terminals, a coherent detector having signal input terminals, phase reference terminals and signal output terminals, an isolating impedance network having at least three terminal pairs, a phase adjusting network having input and output terminals, a signal receiver with input terminals, a transmission line having at least two conductors and two extremities, a modulating reactance having at least signal input terminals and reactance output terminals, and a signal transducer connected to the signal input terminals of said modulating reactance, said reactance output terminals of said modulating reactance connected across the two conductors of said transmission line at one extremity, said output terminals of said alternating current generator connected to one terminal pair of said isolating impedance network, a second terminal pair of said isolating impedance network connected across the two conductors of said transmission line at the other extremity, a third terminal pair of said isolating impedance network connected to the input terminals of said coherent detector, said phase reference terminals of said coherent detector connected to the output terminals of said phase adjusting network, said output terminals of said coherent detector connected to said signal receiver, said input terminals of said phase adjusting network connected to said alternating current generator.

7. Apparatus for producing electrical signals in boreholes and for transmitting said signals therefrom comprising a surface instrument, a subsurface instrument and a hoisting and current-conducting cable interconnecting said surface and subsurface instruments, said subsurface instrument contained in an external housing mechanically and electrically connected to said cable and comprised internally of at least a transducer and an electronic apparatus, said transducer having a transmission path responsive to the materials found in and around said borehole and producing electrical currents which are manifestations thereof, said electronic apparatus requiring electrical power for its operation and having a signal handling path of transmission and a power handling path of transmission, said cable comprised of at least an inner insulated conductor and an outer conducting and mechanically supporting sheath, said transducer and said electronic apparatus connected to said insulated conductor and said external sheath of said cable, said transducer transmission and transducing path and said electronic apparatus power consuming path being series connected and in shunt connection with said electronic apparatus signal handling path, and this combination in series connection with said cable, said surface apparatus comprised of at least an alternating current power generator, electrical means for separating the signals produced by said transducer from the currents of said alternating current power generator comprised of a synchronous demodulator with the signal input to said synchronous demodulator derived from said cable and the reference voltage for said synchronous demodulator derived from said alternating current generator, means for amplifying and recording said transducer signals, said signal separation means, said alternating current generator and said cable being connected in series arrangement.

8. Apparatus for producing electrical signals in boreholes and for transmitting said signals therefrom comprising a surface instrument, a subsurface instrument and a hoisting and current-conducting cable interconnecting said surface and subsurface instruments, said subsurface instrument contained in an external housing mechanically and electrically connected to said cable and comprised internally of at least a transducer and an electronic apparatus, said transducer having a transmission path responsive to the materials found in and around said borehole and producing electrical currents which are manifestations thereof, said electronic apparatus requiring electrical power for its operation and having a signal handling path of transmission and a power handling path of transmission, said cable comprised of at least an inner insulated conductor and an outer conducting and mechanically supporting sheath, said transducer and said electronic apparatus connected to said insulated conductor and said external sheath of said cable, said transducer transmission and transducing path and said electronic apparatus power consuming path being series connected and in shunt connection with said electronic apparatus signal handling path, and this combination in series connection with said cable, said surface apparatus comprised of at least an alternating current power generator, electrical means for separating the signals produced by said transducer from the currents of said alternating current power generator comprised of a three-winding transformer, with said three windings designated as primary, secondary and tertiary, one terminal of each of said primary and tertiary connected together and to one terminal of said generator, the other terminal of said generator connected to said cable sheath, the second terminal of said primary connected to said inner conductor of said cable, second terminal of said tertiary connected to one terminal of an impedance, the other terminal of said impedance connected to said cable sheath, the primary and tertiary windings being wound in opposition about a common ferromagnetic core, said impedance being adjusted to reduce flux variations produced by said alternating current generator in said core by the currents in said primary and tertiary windings to a minimum, said transformer secondary wound about said common ferromagnetic core and having its terminals connected to a means for amplifying and recording said transducer signals, said signal separation means, said alternating current generator and said cable being connected in series arrangement.

References Cited
UNITED STATES PATENTS

| | | | |
|---|---|---|---|
| 3,170,137 | 2/1965 | Brandt | 340—18 |
| 3,195,105 | 7/1965 | Brokaw | 340—18 |
| 3,072,790 | 1/1963 | Hopkinson et al. | 250—83.3 |
| 3,115,579 | 12/1963 | Hall et al. | 250—83.3 |
| 2,934,695 | 4/1960 | Maulsby | 324—34 |
| 2,961,602 | 11/1960 | Bender | 324—34 |
| 2,754,350 | 7/1956 | Hurd | 174—102 |
| 2,954,421 | 9/1960 | McCarthy et al. | 174—102 |
| 2,768,684 | 10/1956 | Castel et al. | 340—18 X |
| 2,871,444 | 1/1959 | Piety | 340—18 X |
| 2,942,112 | 6/1960 | Hearn | 340—18 X |
| 2,973,505 | 2/1961 | Johannesen | 340—18 |
| 3,015,801 | 1/1962 | Kalbfell | 340—18 |
| 3,103,644 | 9/1963 | Burton | 340—18 |
| 3,204,098 | 8/1965 | Hoyer et al. | 250—83.6 |
| 3,212,601 | 10/1965 | Summers | 340—18 X |
| 2,412,575 | 12/1946 | Frosch | 250—83.6 |

BENJAMIN A. BORCHELT, *Primary Examiner.*

SAMUEL FEINBERG, *Examiner.*

R. M. SKOLNIK, *Assistant Examiner.*